Figure 1:
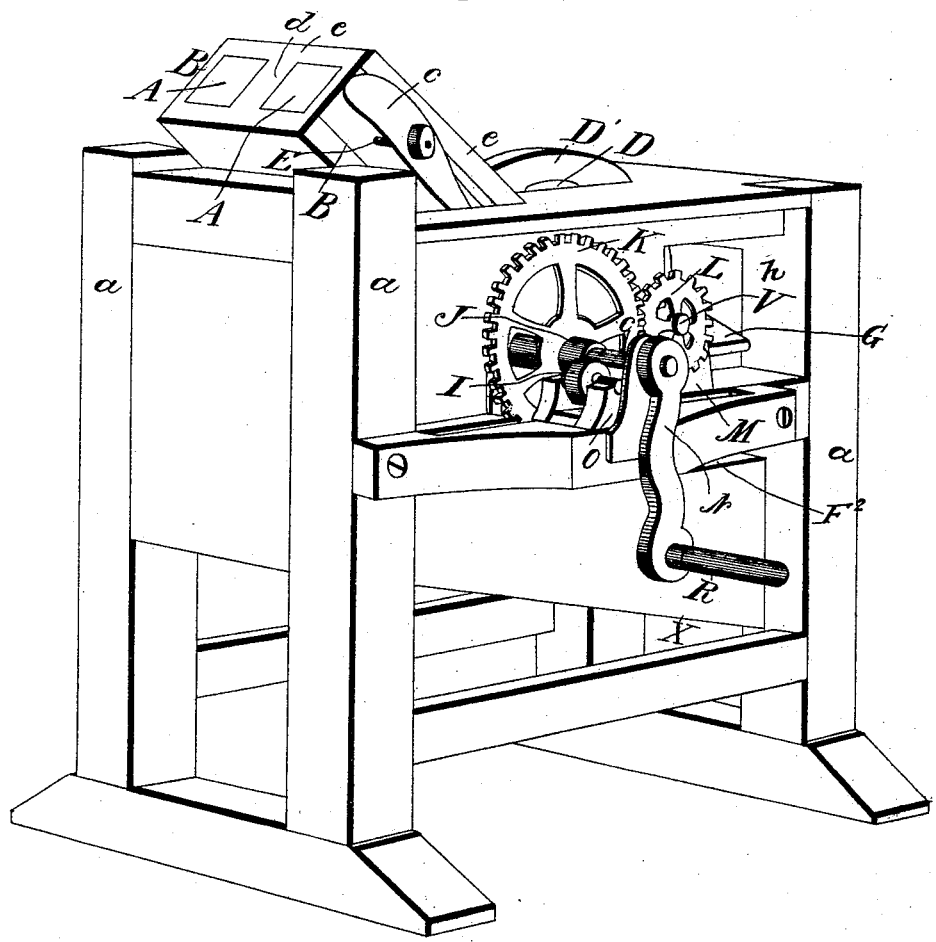

C. SINES.

Corn Sheller.

3 Sheets—Sheet 1.

No. 5,848.

Patented Oct. 10, 1848.

Witnesses:
George Thompson
John Garrett

Inventor:
Chas Sines

C. SINES.
Corn Sheller.
No. 5,848.
3 Sheets—Sheet 2.
Patented Oct. 10, 1848.
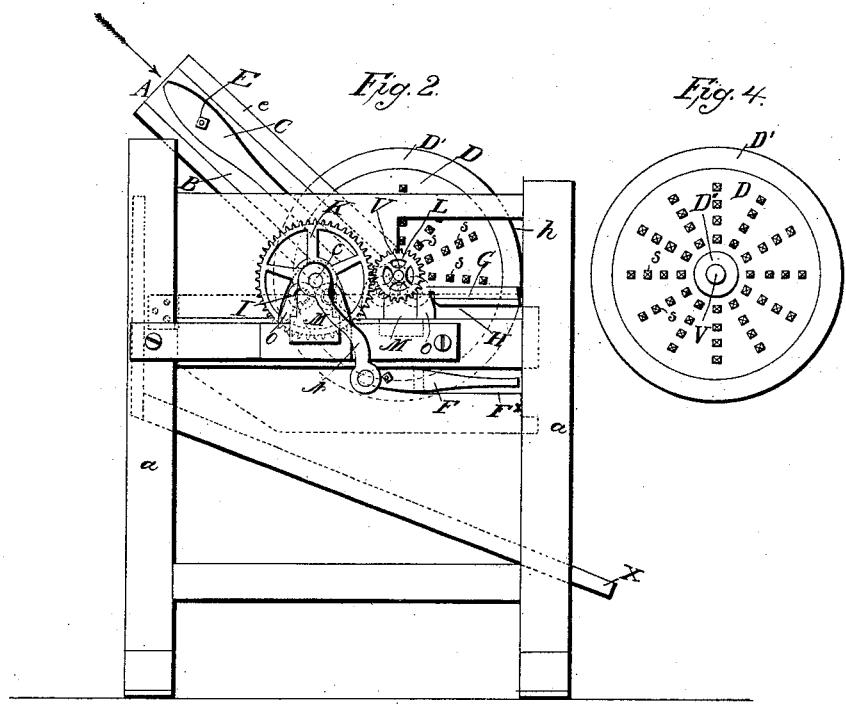
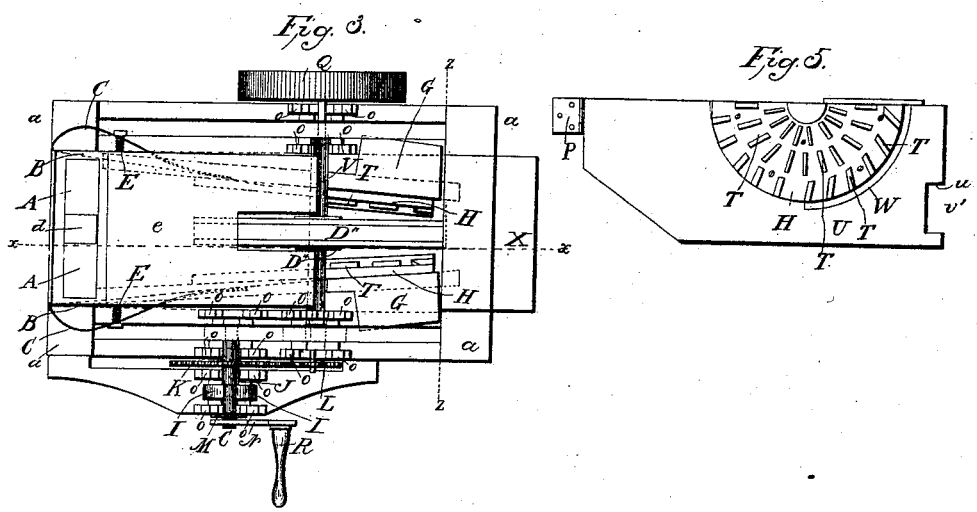
Witnesses:
George Thompson
John Garrity
Inventor:
Chas. Sines.

C. SINES.
Corn Sheller.
No. 5,848.
3 Sheets—Sheet 3.
Patented Oct. 10, 1848.
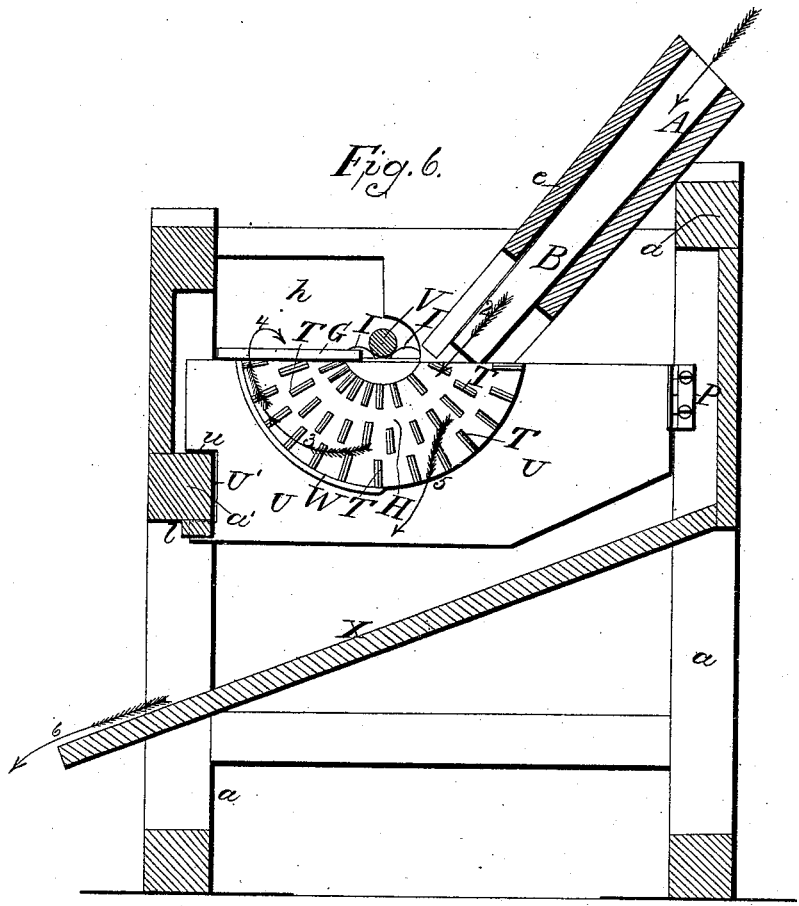
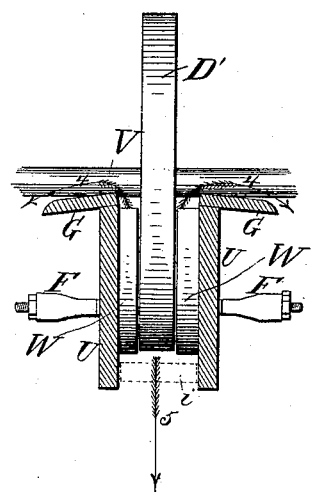
Witnesses:
George Thompson
John Garrett
Inventor:
Chas Sines

UNITED STATES PATENT OFFICE.

CHARLES SINES, OF VILLAGE GREEN, PENNSYLVANIA.

CORN-SHELLER.

Specification of Letters Patent No. 5,848, dated October 10, 1848.

*To all whom it may concern:*

Be it known that I, CHARLES SINES, of Village Green, in the county of Delaware and State of Pennsylvania, have invented a new and useful Improvement in Corn-Shellers, which is described as follows, reference being had to the annexed drawings of the same, making part of this specification.

Figure 1, is a perspective view of the machine. Fig. 2, is a side elevation. Fig. 3, is a top view. Fig. 4 is a view of the toothed side of the shelling wheel. Fig. 5, is a view of the pair of hinged clamp boards next the shelling wheel. Fig. 6, is a vertical longitudinal section on the line $x\ x$ of Fig. 3. Fig. 7, is a vertical cross section on the line $z\ z$ of Fig. 3.

Similar letters in the several figures, refer to corresponding parts.

$a$ is the frame.

V is the shaft of the shelling wheel, turning on, or against, the peripheries of antifriction wheels or rollers I contained in boxes O.

D is the shelling wheel affixed to shaft V, having rows of pyramidal shaped teeth S arranged in radial rows and concentric circles on its two flat surfaces for shelling the corn from the cobs—having a circular rim D' on its periphery to act as a fly wheel, and a hub D'' at the center.

L is a pinion on the shaft of the shelling wheel.

K is a cog wheel geared with said pinion L.

C is the shaft of the cog wheel.

I are antifriction wheels on which said shaft C turns.

O are boxes of the anti-friction rollers.

M are holding plates through which the several axles pass—said plates being secured to the frame for the purpose of preventing the rising of the axles from the antifriction rollers.

N is the winch for turning the cog wheel.

A, A, are two inclined hoppers for conducting the ears of corn to the shelling wheel. $d$ is the central partition to which the top and bottom are fastened.

B, B, are the sides of the hoppers made fast at the upper ends and loose at the lower ends in order to yield outward from or close inward toward the shelling wheel for the purpose of admitting larger or smaller ears to be shelled and to allow the ears to turn on their axes in the hoppers, during the shelling operation.

C are steel springs attached to the sides of the hoppers by adjustive screws E and made to bear against them for the purpose of increasing or diminishing the elasticity of the sides of the hoppers.

X is an inclined board upon which the shelled corn is discharged and by which it is conducted outside the frame.

$e$ is an inclined cap board placed over the hoppers and forming the top of the same to prevent the corn and cobs flying upward from the machine. The cap over the shelling wheel is left off for the purpose of exposing the wheel and discharging aprons of the clamp boards.

U, U, are two clamp boards hinged to the front posts of the frame below the hoppers by hinges P such as that represented at P Fig. 5, attached to the front ends of the said boards V which have their lower front corners removed at the same angle of the discharging board X to which they are fitted loosely so that they can vibrate freely over it, the rear ends of which boards V being notched at U' to allow said ends to move toward or from the shelling wheel in the arcs of circles scribed from the hinges the portion of the board marked $u$ sliding upon the rail. One of these hinged clamp boards is placed on each side of the shelling wheel and near to it. On the side of each hinged clamp board, next the shelling wheel, is secured a cast iron semi-circular plate H armed with teeth T on its flat surface next the wheel, and having a segmental conductor W formed around a segment of its lower curved edge nearest the discharging ends of the machine for the purpose of catching the cobs and preventing their escape with the corn, and conducting them to the upper edges of said clamp boards to the discharging aprons G which conduct them laterally to the right and left through openings $h$ in the sides of the casing of the frame. These aprons are fastened to the upper edges of the hinged clamp boards and incline outward and downward from them at a suitable angle to discharge the cobs freely.

The teeth on the segments are designed for the purpose of stripping the remaining kernels from the cob after they have passed down below the center of the shelling wheel.

The semi-circular flanges, or conductors, W, are designed to catch the cobs with what kernels remain upon them and hold them in contact with the shelling wheel till all the kernels are stripped from the cobs and also to conduct them to the discharge openings h when the cobs will pass out from between the toothed and flanged castings on the hinged clamp boards and shelling wheel and escape laterally over the inclined aprons b of said boards through the openings h of the side casing to the outside of the frame entirely separated from the corn, which is discharged at the rear end of the machine. The aforesaid segmental flanges or conductors W prevent the cobs from descending with the corn to the inclined conducting board X effectually.

F F are curved springs attached to the sides of the frame and passing through oblong slits $F^2$ therein and bearing with their smaller ends against the hinged clamp boards in order to keep the said hinged clamp boards against a gage block i placed between the clamp boards and secured to the frame, and contiguous to the shelling wheel, and retaining the semi circular flanges W so near the shelling wheel as to prevent the escape of the cobs below its circumference. The aforesaid gage block i must be of sufficient length to prevent the castings on the clamp boards from touching the shelling wheel. The gage block i may be secured to the under side of the cross timber a' of the frame; or in any convenient place.

The shelling wheel D cogged and flanged casting H, cog wheels K, L antifriction rollers I, roller stands or boxes o and shaft holders M may be made of cast iron, or other suitable material. The crank, shafts, and bolts should be made of wrought iron. The springs to be made of good steel. The rest of the machine may be made of wood, or other suitable material.

The arrows 1 and 2 Figs. 6 and 7, show the direction of the ears of corn in passing the shelling wheel; and the arrows 5 and 6, show the direction the cobs are carried by the shelling wheel; and the arrows 5 and 6, show the direction in which the shelled corn is discharged.

What I claim as my invention and desire to secure by Letters Patent, is—

The combination of the vibrating hinged clamp boards U with the revolving shelling wheel D for separating the cobs from the corn during the operation of shelling said clamp boards being constructed with segmental conductors W and incline aprons G arranged and operated in the manner and for the purpose set forth.

In testimony whereof I have hereunto signed my name before two subscribing witnesses.

CHAS. SINES.

Witnesses:
RICHARDSON L. WRIGHT,
PHILIP FORD.